(12) United States Patent
Eagland et al.

(10) Patent No.: US 7,651,981 B2
(45) Date of Patent: Jan. 26, 2010

(54) RECOVERING MATERIALS

(75) Inventors: Donald Eagland, Huddersfield (GB); Nicholas John Crowther, Bradford (GB); James Murray, Ellon (GB); Austin Tobin, Ellon (GB)

(73) Assignees: Advanced Gel Technology Limited (GB); Aubin Limited (GB)

( * ) Notice: Subject to any disclaimer, the term of this patent is extended or adjusted under 35 U.S.C. 154(b) by 750 days.

(21) Appl. No.: 10/509,281

(22) PCT Filed: Mar. 28, 2003

(86) PCT No.: PCT/GB03/01402

§ 371 (c)(1),
(2), (4) Date: Apr. 12, 2005

(87) PCT Pub. No.: WO03/083259

PCT Pub. Date: Oct. 9, 2003

(65) Prior Publication Data

US 2005/0189109 A1    Sep. 1, 2005

(30) Foreign Application Priority Data

Mar. 28, 2002   (GB)   ................................. 0207376.5
Sep. 12, 2002   (GB)   ................................. 0221092.0

(51) Int. Cl.
*C09K 8/588* (2006.01)

(52) U.S. Cl. ........................ 507/223; 507/221; 507/222; 507/224; 507/229; 507/230; 507/239; 507/242; 507/266; 507/268; 166/305.1

(58) Field of Classification Search ........................ None
See application file for complete search history.

(56) References Cited

U.S. PATENT DOCUMENTS 6,660,802 B2 * 12/2003 Eagland et al. ............. 524/804

* cited by examiner

*Primary Examiner*—James Seidleck
*Assistant Examiner*—John J Figueroa (74) *Attorney, Agent, or Firm*—Rothwell, Figg, Ernst & Manbeck, P.C.

(57) ABSTRACT

A process for recovering materials from a subterranean formation, for example in enhanced oil recovery, comprises: (A) (a) (i) selecting a first polymeric material having a repeat unit of formula (A) wherein A and B are the same or different, are selected from optionally-substituted aromatic and heteroaromatic groups and at least one comprises a relatively polar atom or group and $R^1$ and $R^2$ independently comprise relatively non-polar atoms or groups; or (ii) selecting a first polymeric material prepared or preparable by providing a compound of general formula (B) wherein A, B, $R^1$ and $R^2$ are as described above, in an aqueous solvent and causing the groups C=C in said compound to react with one another to form said first polymeric material; (b) selecting a second polymeric material which includes a functional group which is able to react in the presence of said first polymeric material to form a third polymeric material; (c) causing the formation of said third polymeric material by a reaction involving said first and second polymeric materials; and (d) contacting the subterranean formation with said third polymeric material; or (B) contacting the formation with a polymeric material (hereinafter "said third polymer material") which is a product of a reaction involving: (a) a first polymeric material as described in (A) (a) (i) or (ii); and (b) a second polymeric material which includes a functional group which is able to react in the presence of said first polymeric material to form said third polymeric material.

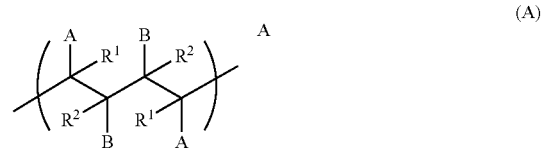

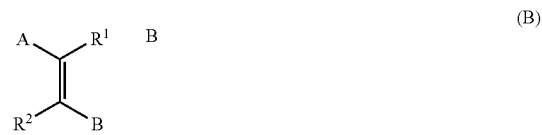

26 Claims, 1 Drawing Sheet

FIG. 1

RECOVERING MATERIALS

CROSS REFERENCE TO RELATED APPLICATION

This application is a 35 USC § 371 National Phase Entry Application from PCT/GB03/001402, filed Mar. 28, 2003, and designating the U.S.

This invention relates to a process for recovering materials and particularly, although not exclusively, relates to a process for recovering materials, for example organic fluids such as oil, tar or gas from a subterranean reservoir.

Organic fluids, such as oil found within a subterranean formation, for example in a reservoir, are recovered via production wells which are drilled into the subterranean formulation. Generally a large amount of oil is left in the formation after recovery by primary recovery methods which utilize only the natural forces present in the formation for forcing oil into the production wells. Where the initial formation energy is inadequate or has become depleted through production from the well, supplementary processes referred to as secondary, tertiary and quaternary recovery operations are utilized in order to recover a larger percentage of the oil.

Known secondary recovery techniques include steam flooding and water flooding. In these techniques, steam or water is injected into an injection well spaced from a production well. The injected fluid forces oil within the formation to move towards the production well from which it may be recovered.

Tertiary recovery process utilise chemicals to further increase the efficiency of the removal of oil from oil bearing layers. The known chemicals used have generally been of two types. The first comprises a surfactant or like product which alters the oil/water/rock surface tension. The second type is relatively viscous and provides an increased viscosity which will slow the passage of water through a rock matrix and push any freed oil out. Additionally, substances such as carbon dioxide have been used to assist with the oil removal process leading to higher oil removal from subterranean formations.

In view of the value of oil and the potential financial rewards available if the amounts removed can be increased economically, there are large numbers of patents and other publications which describe so called "enhanced oil-recovery techniques". Many of the techniques described however, still suffer from significant disadvantages. For example the use of surfactants can lead to a change in the wetability of oil-bearing formations which can potentially damage reservoirs. Furthermore, surfactants are often of low viscosity and therefore inefficient "pushers" of oil through formations. Additionally, surfactants may not be heat stable or may otherwise be affected by the temperatures (up to 180° C.) or pressures (20000-30000 psi) to which they can be subjected in use.

It is an object of the present invention to address problems associated with recovery of organic fluids from subterranean formations, especially with tertiary oil recovery.

According to a first aspect of the invention, there is provided a process for recovering materials from a subterranean formation, for example a reservoir, the process comprising:

(a) (i) selecting a first polymeric material having a repeat unit of formula wherein A and B are the same or different, are selected from optionally-substituted aromatic and heteroaromatic groups and at least one comprises a relatively polar atom or group and $R^1$ and $R^2$ independently comprise relatively non-polar atoms or groups; or (ii) selecting a first polymeric material prepared or preparable by providing a compound of general formula wherein A, B, $R^1$ and $R^2$ are as described above, in an aqueous solvent and causing the groups C=C in said compound to react with one another to form said first polymeric material;

(b) selecting a second polymeric material which includes a functional group which is able to react in the presence of said first polymeric material to form a third polymeric material;

(c) causing the formation of said third polymeric material by a reaction involving said first and second polymeric materials; and (d) contacting the subterranean formation with said third polymeric material.

According to a second aspect of the invention, there is provided a process for recovering materials from a subterranean formation for example a reservoir, the process comprising contacting the formation with a polymeric material (herein "said third polymeric material") which is a product of a reaction involving:

(a) (i) a first polymeric material having a repeat unit of formula wherein A and B are the same or different, are selected from optionally-substituted aromatic and heteroaromatic groups and at least one comprises a relatively polar atom or group and $R^1$ and $R^2$ independently comprise relatively non-polar atoms or groups; or (ii) a first polymeric material prepared or preparable by providing a compound of general formula wherein A, B, R¹ and R² are as described above, in an aqueous solvent and causing the groups C=C in said compound to react with one another to form said first polymeric material; and (b) a second polymeric material which includes a functional group which is able to react in the presence of said first polymeric material to form said third polymeric material.

Preferably, in said first and second aspects, a said first polymeric material is selected as described in (a) (i).

A and/or B could be multi-cyclic aromatic or heteroaromatic groups. Preferably, A and B are independently selected from optionally-substituted five or more preferably six-membered aromatic and heteroaromatic groups. Preferred heteroatoms of said heteroaromatic groups include nitrogen, oxygen and sulphur atoms of which oxygen and especially nitrogen, are preferred. Preferred heteroaromatic groups include only one heteroatom. Preferably, a or said heteroatom is positioned furthest away from the position of attachment of the heteroaromatic group to the polymer backbone. For example, where the heteroaromatic group comprises a six-membered ring, the heteroatom is preferably provided at the 4-position relative to the position of the bond of the ring with the polymeric backbone.

Preferably, A and B represent different groups. Preferably, one of A or B represents an optionally-substituted aromatic group and the other one represents an optionally-substituted heteroaromatic group. Preferably A represents an optionally-substituted aromatic group and B represents an optionally-substituted heteroaromatic group especially one including a nitrogen heteroatom such as a pyridinyl group.

Unless otherwise stated, optionally-substituted groups described herein, for example groups A and B, may be substituted by halogen atoms, and optionally substituted alkyl, acyl, acetal, hemiacetal, acetalalkyloxy, hemiacetalalkyloxy, nitro, cyano, alkoxy, hydroxy, amino, alkylamino, sulphinyl, alkylsulphinyl, sulphonyl, alkylsulphonyl, sulphonate, amido, alkylamido, alkylcarbonyl, alkoxycarbonyl, halocarbonyl and haloalkyl groups. Preferably, up to 3, more preferably up to 1 optional substituents may be provided on an optionally substituted group.

Unless otherwise stated, an alkyl group may have up to 10, preferably up to 6, more preferably up to 4 carbon atoms, with methyl and ethyl groups being especially preferred.

Preferably, A and B each represent polar atoms or group— that is, there is preferably some charge separation in groups A and B and/or groups A and B do not include carbon and hydrogen atoms only.

Preferably, at least one of A or B includes a functional group which can undergo a condensation reaction, for example on reaction with said second polymeric material. Preferably, A includes a said functional group which can undergo a condensation reaction.

Preferably, one of groups A and B includes an optional substituent which includes a carbonyl or acetal group with a formyl group being especially preferred. The other one of groups A and B may include an optional substituent which is an alkyl group, with an optionally substituted, preferably unsubstituted, $C_{1-4}$ alkyl group, for example a methyl group, being especially preferred.

Preferably, A represents a group, for example an aromatic group, especially a phenyl group, substituted (preferably at the 4-position relative to polymeric backbone when A represents an optionally-substituted phenyl group) by a formyl group or a group of general formula

II where x is an integer from 1 to 6 and each R³ is independently an alkyl or phenyl group or together form an alkalene group.

Preferably, B represents an optionally-substituted heteroaromatic group, especially a nitrogen-containing heteroaromatic group, substituted on the heteroatom with a hydrogen atom or an alkyl or aralkyl group. More preferably, B represents a group of general formula

III wherein R⁴ represents a hydrogen atom or an alkyl or aralkyl group, R⁵ represents a hydrogen atom or an alkyl group and X⁻ represents a strongly acidic ion.

Preferably, R¹ and R² are independently selected from a hydrogen atom or an optionally-substituted, preferably unsubstituted, alkyl group. Preferably, R¹ and R² represent the same atom or group. Preferably, R¹ and R² represent a hydrogen atom.

Preferred first polymeric materials may be prepared from any of the compounds described on page 3 line 8 to line 39 of GB2030575B by the method described in WO98/12239 and the contents of the aforementioned documents are incorporated herein by reference.

Said first polymeric material may be of formula wherein A, B, R¹ and R² are as described above and n is an integer. Integer n is suitably 10 or less, preferably 8 or less, more preferably 6 or less, especially 5 or less. Integer n is suitably at least 1, preferably at least 2, more preferably at least 3. Preferably, formation of said third polymeric material from said first and second polymeric materials involves a condensation reaction. Preferably, formation of said third polymeric material involves an acid catalysed reaction. Preferably, said first and second polymeric materials include functional groups which are arranged to react, for example to undergo a condensation reaction, thereby to form said third polymeric material. Preferably, said first and second polymeric materials include functional groups which are arranged to react for example to undergo an acid catalysted reaction thereby to form said third polymeric material.

Preferably, said second polymeric material includes a functional group selected from an alcohol, carboxylic acid, carboxylic acid derivative, for example an ester, and an amine group. Said second polymeric material preferably includes a backbone comprising, preferably consisting essentially of carbon atoms. The backbone is preferably saturated. Pendent from the backbone are one or more said functional groups described. Said polymer may have a molecular weight of at least 10,000. Said second polymeric material is preferably a polyvinyl polymer. Preferred second polymeric compounds include optionally substituted, preferably unsubstituted, polyvinylalcohol, polyvinylacetate, polyalkylene glycols, for example polypropylene glycol, and collagen (and any component thereof).

Suitably, a mixture comprising 0.3 wt % or less, preferably 0.25 wt % or less, more preferably 0.2 wt % or less of said first polymeric material is used in the preparation of said third polymeric material. Suitably, said mixture includes 3 wt % or less, preferably 2.5 wt % or less, more preferably 2 wt % or less of said second polymeric material. Preferably, said mixture includes a solvent, especially water. Said mixture may include at least 80 wt %, suitably includes at least 85 wt %, preferably includes at least 92 wt %, more preferably includes at least 95 wt %, especially includes at least 98 wt % water. Said mixture may include other minor components, for example a catalyst, especially an acid, for catalysing the formation of said third polymeric material from said first and second polymeric materials. In some cases, said water may be derived from sea water and, accordingly, said mixture may include salts (e.g. sodium chloride) and other components found in sea water. In general terms water for use as described herein may be derived from any convenient source. It may be potable water, surface water, sea water, aquifer water, deionised production water and filtered water derived from any of the aforementioned sources. The water may be treated so that it is suitable for use as an injection fluid. For example, it may be treated by addition of oxygen scavengers, biocides, corrosion inhibitors, scale inhibitors, anti-foaming agents and flow improvers. Sea water and/or water from other sources may be deoxygenated and/or desulphonated.

Said mixture suitably includes at least 0.0001 wt %, preferably at least 0.001 wt %, more preferably at least 0.01 wt %, especially at least 0.05 wt % of said first polymeric material. Said mixture suitably includes at least 0.01 wt %, preferably at least 0.1 wt %, more preferably at least 1 wt % of said second polymeric material.

Said third polymeric material suitably includes a moiety of formula wherein $R^1$, $R^2$ and B are as described above, $A^1$ represents a residue of group A described above after the reaction involving said first and second polymeric materials, Y represents a residue of said second polymeric material after said reaction involving said first and second polymeric materials and X represents a linking atom or group extending between the residues of said first and second polymeric materials. In one preferred embodiment $A^1$ represents an optionally-substituted phenyl group, X represents a group which is bonded via the oxygen atoms to a residue of said second polymeric material. For example, group X may be bonded to the polymer backbone of said second polymeric material.

Said subterranean formation suitably includes a production means, for example a production well, via which materials, for example organic fluids such as oil, may be removed from the subterranean formation. Preferably, the subterranean formation is contacted with said third polymeric material upstream of the production means. Said subterranean formation may include one or more of said production means.

Said subterranean formation suitably includes an injection means, for example an injection well, via which fluid may be injected into the subterranean formation for driving materials within the formation towards said production means. Said subterranean formation may include one or more said injection means.

Said production means and injection means are suitably spaced apart across a reservoir which contains materials, for example, oil to be removed.

The process of said first and second aspects preferably includes the step of injecting a first injection fluid into the subterranean formation via said injection means. Said first injection fluid preferably includes a solvent which is preferably water. Said water may be derived from sea water.

A said first injection fluid may be prepared which comprises said third polymeric material and, after preparation, said first injection fluid may be injected into the subterranean formation. Alternatively, a said first injection fluid may be prepared which comprises said first and second polymeric materials and such a first injection fluid may be injected into the subterranean formation and arranged to produce said third polymeric material downstream of a position of injection of the injection fluid into the subterranean formation. Preferably, said first injection fluid which forms said third polymeric material in skit includes an acid and/or catalyst as described above to facilitate production of the third polymeric material.

Thus, said first injection fluid preferably carries the third polymeric material within the subterranean formation, whether the third polymeric material is produced prior to or after injection of the injection fluid into the formation.

Said first injection fluid is suitably arranged to have a viscosity (suitably when it comprises said third polymeric material) which is greater than the viscosity of water. The ratio of the viscosity of said first injection fluid (when it comprises said third polymeric material) to that of water may be at least 1.5, preferably at least 2, more preferably at least 3, especially at least 4. The ratio may be less than 100. Advantageous, the first-injection fluid may be formulated with varying viscosities by varying the relative amounts and/or concentrations of the first and second polymeric materials used to prepare the third polymeric material. The viscosity of said first injection fluid (when it comprises said third polymeric material) may be less than 10 centipoise. Suitably, it is greater than 1 centipoise, preferably greater than 2 centipoise, more preferably greater than 3 centipoise, especially greater than 4 centipoise.

In some circumstances, it may be desirable to reduce the viscosity of the first injection fluid after it has been introduced into the subterranean formation. More particularly, it is possible injection fluid may be misplaced in the subterranean formation and/or may cause a blockage or other detrimental effect on the formation. It will be appreciated that partially blocking a subterranean formation could have severe financial consequences if, by so doing, substantial quantities of potentially recoverable materials such as oil are then rendered irrecoverable. Consequently, it can be risky (and a risk that oil companies may in many circumstances be unwilling to take) to introduce into a formation a viscous formulation unless it is also possible to provide an antidote to the formulation if problems arise. Advantageously, the third polymeric material according to preferred embodiments of the present invention can be treated to cleave polymeric chains thereof. Preferably, the third polymeric material is treated with an oxidizing agent, preferably an aqueous solution of an oxidizing agent, to cleave it. Preferably, the third polymetric material, more preferably the part thereof derived from said second polymeric material, can be treated with periodate, for example sodium or potassium periodate, to cleave it and suitably, therefore, to reduce the molecular weight of the third polymeric material. Preferred third polymeric materials which can be cleaved as described including 1,2-diol linkages. Preferred third polymeric materials incorporate polyvinyl alcohol moieties. For example, the part of said third polymeric material derived from said second polymeric material may include polyvinylalcohol moieties. As a consequence of cleavage of polymeric chains as described, the viscosity of a said first injection fluid within the subterranean formation may be reduced by at least 0.5, preferably at least 1, more preferably at least 2 centipoise. Advantageously, the viscosity may be reduced to 2 centipoise or less. Cleavage of the third polymeric material as described is suitably irreversible.

Said first injection fluid (suitably when it comprises said third polymeric material) is suitably arranged to lower the interfacial tension between water and oil. Thus, the interfacial tension between water which may be used to drive materials to a said production means and oil in the absence of said third polymeric material may be less than in the presence of said third polymeric material.

Said first injection fluid is preferably injected into the formation at ambient temperature. It is suitably injected at a pressure below the fracture pressure of the formation.

After injection of said first injection fluid, a second injection fluid may be injected via said injection means into said formation. Said second injection fluid is arranged to contact the visco-elastic liquid of said first injection fluid and push the liquid and material contained within the formulation to a production well. Said second injection fluid may be selected from any such fluids known to those skilled in the art. For example it may comprise sea water or a gas such as carbon dioxide. Said second injection fluid suitably has a lower viscosity than said first injection fluid.

According to a third aspect, there is provided a formulation comprising:
(a) said first polymeric material described above;
(b) said second polymeric material described above;
(c) water; and
(d) a salt.

Said salt may be sodium chloride. Said water may be derived from sea water containing said salt. Said formulation preferably includes an acid, especially a protic acid.

According to a fourth aspect, there is provided a formulation comprising:
(a) a third polymeric material described above;
(b) water; and
(c) a salt Said salt and water may be as described above.

According to a fifth aspect, there is provided a formulation comprising salt water and a periodate, especially an alkali metal periodate such as sodium or potassium periodate. The formulation described is suitably for use in cleaving the third polymeric material described in preceding aspects of the invention.

According to a sixth aspect of the present invention, there is provided a subterranean formation treatment method comprising:

contacting a subterranean formation with a formulation having a first viscosity, wherein said formulation includes a polymeric material having 1,2-diol linkages; and contacting the polymeric material with a cleavage composition which is able to cleave 1,2-diol linkages of the polymeric material and thereby reduce the viscosity of the formulation.

Advantageously, the cleavage composition is able to break down the polymeric material and thereby make it easier to move or remove the formulation and/or polymeric material from the subterranean formation. The cleavage composition preferably comprises a periodate as described herein. Said polymeric material in said formulation preferably comprises a polyhydric alcohol polymer which is cross-linked by a cross-linker. Said polymeric material in said formulation preferably includes a polyvinylalcohol moiety. Said formulation may include a polyvinylalcohol moiety as part of a homopolymer or co-polymer. Said polyvinylalcohol moiety may be cross-linked. It is preferably cross-linked by a first polymeric material described according to said first aspect.

In preferred embodiments, said formulation having said first viscosity is a formulation comprising a third polymeric material according to the first aspect.

Any feature of any aspect of any invention described herein may be combined with any feature of any aspect of any other invention described herein mutatis mutandis.

Specific embodiments of the invention will now be described by way of example with reference to FIG. 1 which is a diagrammatic cross-section through a subterranean oil-bearing formation which includes a production and an injection well.

Figure 1:
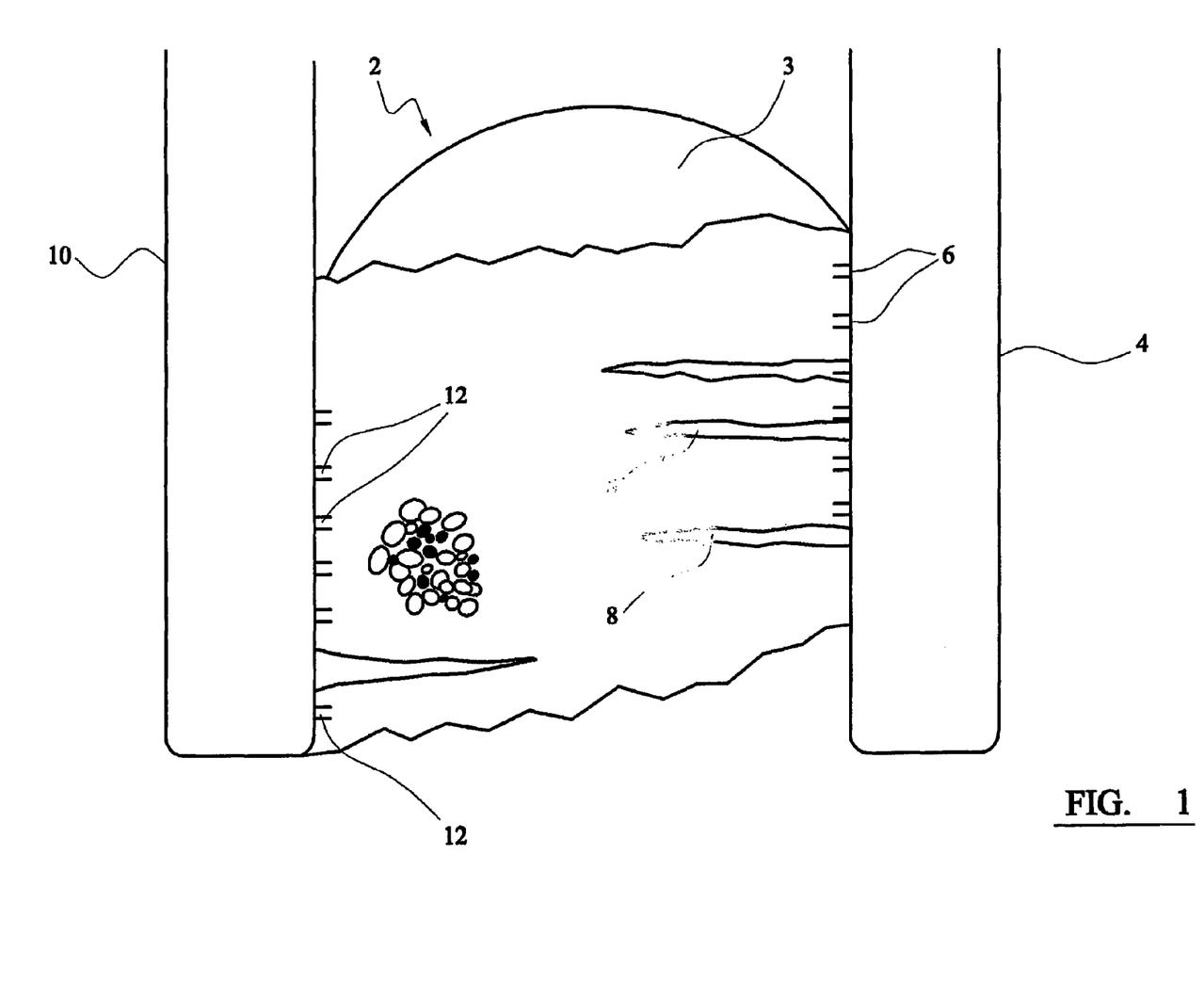

Referring to FIG. 1, there is shown a subterranean fluid (e.g. oil/gas) bearing formation 2, including gas reservoir 3, in which production wells (e.g. production well 4) having production perforations 6 has been formed. Formation fractures a which extend into the primary well are also shown. During primary production, natural pressures within the formation 2 force oil through rock pores into fractures 8 and into the production wells.

Injection wells 10 and associated injection perforations 12, are drilled in the formation 2 for use in implementing secondary (and subsequent) recovery processes. In a secondary process water or steam may be injected into the injection well 10. The injected fluid passes through the injection perforations and into the oil bearing formation 2 whereupon it forces oil towards and into the production well 4.-

In a tertiary recovery process an aqueous polymer formulation, described further below, is injected into the injection well and caused to move towards the production well. The formulation has viscosity and other physical and chemical properties which enable it to aid the release of oil from within the oil bearing formation and facilitate the transfer of hydrostatic forces to the oil to enable it to be pushed to the production well.

The aqueous polymer formulation comprises poly 1,4-di (4-(N-methylpyridinyl))-2,3-di(4-(1-formylphenyl) butylidene and poly(vinyl alcohol). These two polymers are caused to react in an acid catalysed reaction and the reaction product exhibits the advantageous properties which enable oil to be released and pushed towards the production well.

Examples 1 to 3 describe the preparation of the butylidene polymer; a blend of the polymer with poly(vinylalcohol); and a reaction product of the two polymers.

EXAMPLE 1

Preparation of poly (1,4-di (4-(N-methylpyridinyl))-2,3-di(4-(1-formylphenyl)butylidene This was prepared as described in Example 1 of PCT/GB97/02529, the contents of which are incorporated herein by reference. In the method, an aqueous solution of greater than 1 wt % of 4-(4-formylphenylethenyl)-1-methylpyridinium methosulphonate (SbQ) is prepared by mixing the SbQ with water at ambient temperature. Under such conditions, the SbQ molecules form aggregates. The solution was then exposed to ultraviolet light. This results in a photochemical reaction between the carbon-carbon double bonds of adjacent 4-(4-formylphenylethenyl)-1-methylpyridinium methosulphate molecules (I) in the aggregate, producing a polymer, poly (1,4-di(4-(N-methylpyridinyl))-2,3-di(4-(1-formylphenyl)butylidene methosulphonate (II), as shown in the reaction scheme below. It should be appreciated that the anions of compounds I and II have been omitted in the interests of clarity.

I

>1% w/w Aqueous solution
UV irradiation

II

EXAMPLE 2

Preparation of Polymer Blend

A blend was prepared comprising 0.125 wt % of the butylidene polymer of Example 1 and 2 wt % of 88% hydrolysed poly(vinylalcohol) of molecular weight 300,000 in water. Suitably, the poly(vinylalcohol) is added slowly with constant stirring to an aqueous solution of the butylidene polymer so as to disperse the poly(vinylalcohol). Final dissolution may be achieved by maintaining the solution at a temperature of 60° C. for a period of 6 hours.

EXAMPLE 3

Preparation of Visco-Elastic Liquid

To the aqueous solution of the polymer blend described in Example 2 was added 0.01 wt % of 0.25M hydrocholoric acid. This causes the butylidene and the poly(vinylalcohol) polymers to react according to the scheme below.

-continued

The concentration of acid affects the speed of the reaction and therefore the development of the visco-elastic properties.

In a tertiary recovery process, the visco-elastic formulation may be prepared (so that the visco-elastic liquid of Example 3 is preformed) and, subsequently, it can be injected into the injection well in a conventional manner. The formulation is arranged to form a "squeeze" or a slug of material within the subterranean formation for example in oil-containing regions thereof. The squeeze has a greater viscosity than that of water and can have two effects: The first is that it can aid the release of oil from the formation by lowering interfacial tension; the second is that it can help the oil to be pushed out of the formation to the production well. As an alternative to the visco-elastic liquid being pre-formed a mixture comprising butylidene polymer, poly(vinylalcohol) and acid may be pumped into the injection well. During passage into the subterranean formation via the injection perforations, the reaction proceeds to produce the visco-elastic solution in skit which can then release oil and enable it to be driven to the production well as described above. The oil is pushed to the production well by a fluid injected into the formation via the injection well after the visco-elastic formulation is in skit. The fluid may be sea water, carbon dioxide or any other available fluid.

It will be appreciated that subterranean formulations vary significantly from one to another. Advantageously, the visco-elastic formulations used can be tailored for use with any particular formation so as to optimums recovery of oil therefrom and minimise damage of the formation. For example the viscosity of the formulation may be adjusted by varying the relative amounts and/or concentration of the butylidene and poly(vinylalcohol) polymers, and, in the case of the in skit formation of the visco-elastic liquid, the amount and/or concentration of acid may be adjusted to control the time taken for the visco-elastic liquid to form.

Examples 4 and 5 detail a simulation of the effect of use of the visco-elastic solution described.

EXAMPLE 4

Laboratory Simulation of Crude Oil Reservoir

A glass tube with sintered discs at each end, to which is applied a fluid flow, was constructed. Between the porous sintered discs was placed sand obtained from mainland UK which was taken to be representative of an unconsolidated sandstone type of formation.

The sand core was flooded with oil (obtained from the North Sea area) and left to stand for 24 hours.

All further tests were carried out at room temperature.

After standing, potable water was applied to the system through the bottom end of the column by flowing through the sintered disc. As the water entered the bottom of the column the oil was forced up and out of the top. The removed oil was collected in containers of measured amounts. The flow of water was continued until the oil level in the water exiting the column was less than 5% by volume as seen from the level in the calibrated containers. The column at this point was still visually seen to contain oil, held on and between the sand grains.

To the water flow was added an aqueous solution of one-twentieth part of the column volume (to simulate the formation of a "squeeze" referred to above) comprising 0.125 wt % of the butylidene polymer of Example 1, 2 wt % of the poly(vinylalcohol) described in Example 2 and 0.01 wt % of hydrocholoric acid catalyst.

The aqueous solution described was applied at one tenth of the flow rate of the original water applied to the column. This rate was continued until the new fluid was thought to be 25% of the distance up from the bottom of the column, at which point the flow rate was increased until at 50% of the distance up from the bottom of the column, the flow rate was the same as the original applied water rate.

During the addition of the aqueous solution, oil was seen to separate from the sand on the walls of the glass column and flow upwards as a discrete band.

After one and a half volumes of the water volume calculated to be present in the column the oil content of the water leaving the column and being collected in measured amounts was seen to increase.

From an initial calculation of the original amount of oil placed in the sand column, less the amount found to be present in the recovered aliquots, there was a difference of around 25% of the original amount applied still present in the sand column.

A peak of oil content was found at about 4 volumes of the water content of the column. After this point the oil content dropped off markedly.

The total volume of oil removed from the column was calculated and found to be approximately 93% of the original volume of oil applied to the column.

EXAMPLE 5

The procedure of Example 4 was followed except that the temperature of the arrangement was increased to 56° C. It was found that oil was recovered to the extent generally described in Example 4.

Properties of the visco-elastic solution used in the oil recovery of Examples 4 and 5 include:
 (a) It is stable in typical sea water obtained from the North Sea
 (b) It is not affected detrimentally by temperatures of 150° C. and above. .

(c) It is stable at temperatures below 0° C. and may be prepared and/or applied in cold climates as well as hot.

(d) It is not affected detrimentally by pressure of 7000 psi and above.

In oil recovery from a natural oil bearing formation, a flow of liquid from a suitable source (e.g. sea water) may be mixed with the three components described in Example 3 and the slightly viscous gel fluid can then be added to an injection well using appropriate pumping equipment. The flow rate of the fluid may be carefully controlled in dependence upon data collected from analyses of previous core samples, thereby to optimums the effectiveness of the oil recovery.

The exact composition of the formulation of the three components of Example 3 used may be varied depending upon the density and viscosity of oil being extracted; the density of water in the oil reservoir; the temperature and pressure in the oil reservoir; and the porosity and permeability of the oil bearing layers from which the oil is produced.

The visco-elastic solution may additionally be weighted (increased in density) for some applications by suspension is in brine systems which may be included in formulations of three components to increase the density of the applied system thereby to further enhance the application and effectiveness of the chemicals used.

Advantageously, if the gel fluid is misplaced in the injection well or otherwise needs to be moved or removed, a formulation comprising a periodate (e.g. sodium or potassium periodate) in water, suitably sea water, may be prepared. The concentration may be up to the saturated solubility limit of the periodate in the water. The periodate-containing formulation may then be injected into the well. The periodate causes cleavage of 1,2-diol linkages of the moiety, in the polymeric material, derived from polyvinylalcohol and consequently the viscosity of the gel fluid is reduced, facilitating its removal from the well.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A process of recovering materials from a subterranean formation, wherein said subterranean formation includes a production means via which organic fluids can be removed from the subterranean formation and an injection means via which an injection fluid can be injected into the subterranean formation, wherein the process comprises injecting an injection fluid into the subterranean formation via said injection means to drive materials within the formation towards said production means, wherein said injection fluid comprises:

(I) a first polymeric material and a second polymeric material which can react with the first polymeric material to form a third polymeric material; and/or (II) a said third polymeric material;

wherein said first polymeric material comprises:

(i) a first polymeric material having a repeat unit of formula wherein A and B, which are the same or different, are selected from optionally-substituted aromatic and heteroaromatic groups and at least one comprises a relatively polar atom or group and $R^1$ and $R^2$ independently comprise relatively non-polar atoms or groups; or (ii) a first polymeric material prepared by providing a compound of general formula wherein A, B, $R^1$ and $R^2$ are as described above, in an aqueous solvent and causing the groups C=C in said compound to react with one another to form said first polymeric material;

wherein said second polymeric material includes a functional group which is able to react in the presence of said first polymeric material to form a said third polymeric material; and wherein said third polymeric material comprises a product of a reaction involving:

(a) a first polymeric material as described in (i) or (ii); and (b) a second polymeric material which includes a functional group which is able to react in the presence of said first polymeric material to form said third polymeric material.

2. A process according to claim 1, wherein A and B are independently selected from optionally-substituted five or six-membered aromatic and heteroaromatic groups.

3. A process according to claim 1, wherein A and B represent different groups.

4. A process according to claim 1, wherein one of A and B represents an optionally-substituted aromatic group and the other one represents an optionally-substituted heteroaromatic group.

5. A process according to claim 1, wherein A represents an optionally-substituted aromatic group and B represents an optionally-substituted heteroaromatic group.

6. A process according to claim 1, wherein B represents an optionally-substituted pyridinyl group.

7. A process according to claim 1, wherein at least one of A and B includes a functional group which can undergo a condensation reaction.

8. A process according to claim 7, wherein A includes said functional group which can undergo a said condensation reaction.

9. A process according to claim 1, wherein one of groups A and B includes an optional substituent which includes a carbonyl or acetal group with the other one of groups A and B including an optional substituent which is an alkyl group.

10. A process according to claim 1, wherein A represents an aromatic group substituted by a formyl group or a group of general formula

II where x is an integer from 1 to 6 and each $R^3$ is independently an alkyl or phenyl group or together form an alkalene group.

11. A process according to claim 1, wherein B represents an optionally-substituted nitrogen containing heteroaromatic group.

12. A process according to claim 1, wherein B represents a group of general formula

III wherein $R^4$ represents a hydrogen atom or an alkyl or aralkyl group, $R^5$ represents a hydrogen atom or an alkyl group and $X^-$ represents a strongly acidic ion.

13. A process according to claim 1, wherein $R_1$ and $R_2$ are independently selected from a hydrogen atom or an optionally-substituted alkyl group.

14. A process according to claim 1, wherein $R_1$ and $R_2$ represent the same atom or group.

15. A process according to claim 1, wherein $R_1$ and $R_2$ represent a hydrogen atom.

16. A process according to claim 1, wherein said first and second polymeric materials include functional groups which are arranged to react thereby to form said third polymeric material.

17. A process according to claim 1, wherein said second polymeric material includes a functional group selected from a alcohol, carboxylic acid, carboxylic acid derivative and an amine group.

18. A process according to claim 1, wherein said second polymeric compound is selected from optionally-substituted polyvinylalcohol, polyvinylacetate and polyalkylene glycol.

19. A process according to claim 1, wherein a mixture comprising 0.3 wt % or less of said first polymeric material is used in the preparation of said third polymeric material.

20. A process according to claim 19, wherein said mixture includes 3 wt % or less of said second polymeric material.

21. A process according to claim 19, wherein said mixture includes at least 80 wt % of water.

22. A process according to claim 19, wherein said mixture includes at least 0.0001 wt % of said first polymeric material; and at least 0.01 wt % of said second polymeric material.

23. A process according to claim 1, wherein said third polymeric material includes a moiety of formula wherein $R^1$, $R^2$ and B are as described above, $A^1$ represents a residue of group A described above after the reaction involving said first and second polymeric materials, Y represents a residue of said second polymeric material after said reaction involving said first and second polymeric materials and X represents a linking atom or group extending between the residues of said first and second polymeric materials.

24. A process according to claim 1, wherein said injection fluid is arranged to have a viscosity which is greater than the viscosity of water.

25. A process according to claim 1, wherein the viscosity of said injection fluid is greater than 1 centipoise and is less than 10 centipoise.

26. A process according to claim 1, wherein after injection of said injection fluid, a second injection fluid is injected via said injection means into said formation.

* * * * *

UNITED STATES PATENT AND TRADEMARK OFFICE
CERTIFICATE OF CORRECTION

PATENT NO. : 7,651,981 B2 Page 1 of 1
APPLICATION NO. : 10/509281
DATED : January 26, 2010
INVENTOR(S) : Donald Eagland It is certified that error appears in the above-identified patent and that said Letters Patent is hereby corrected as shown below:

On the Title Page, Item (73) should read
(73) Assignee: AGT Energy Limited (GB)

Signed and Sealed this

Seventh Day of September, 2010

David J. Kappos
*Director of the United States Patent and Trademark Office*